No. 765,785. PATENTED JULY 26, 1904.
E. NELSON.
SPEED REDUCING GEAR.
APPLICATION FILED APR. 30, 1903.
NO MODEL.
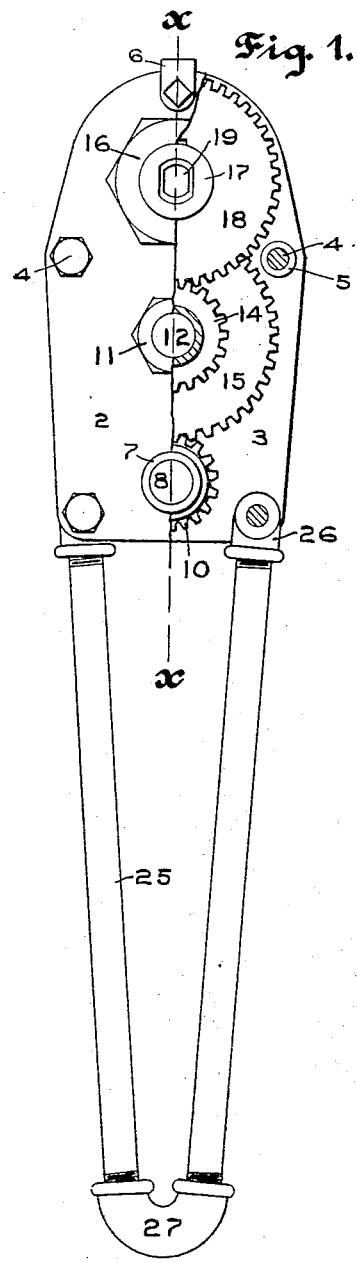
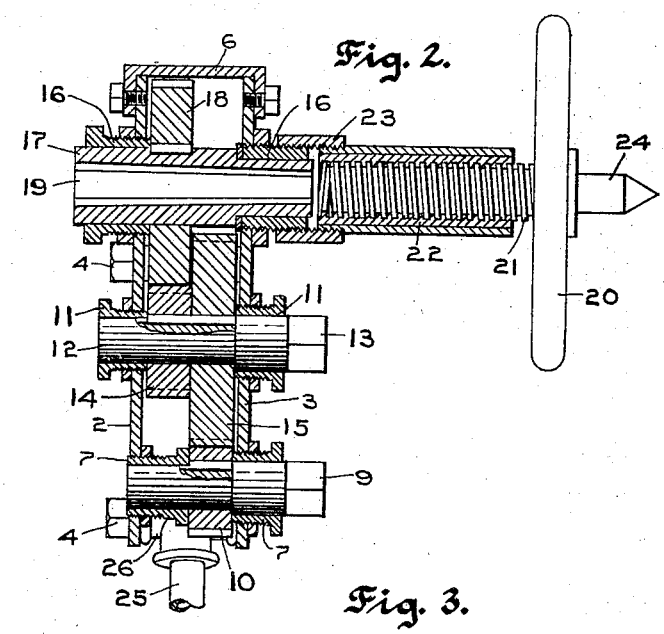
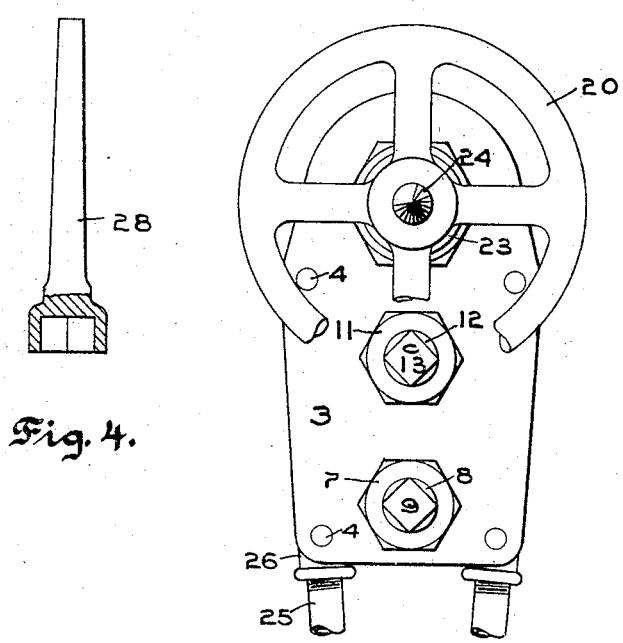
Witnesses,
W. H. Palmer.
Emily F. Otis
Inventor,
Erick Nelson.
by Johnson
his Attorneys.

No. 765,785.                                                              Patented July 26, 1904.

UNITED STATES PATENT OFFICE.

ERICK NELSON, OF ST. PAUL, MINNESOTA.

SPEED-REDUCING GEAR.

SPECIFICATION forming part of Letters Patent No. 765,785, dated July 26, 1904.

Application filed April 30, 1903. Serial No. 154,937. (No model.)

*To all whom it may concern:*

Be it known that I, ERICK NELSON, a citizen of the United States, residing at St. Paul, in the county of Ramsey and State of Minnesota, have invented certain new and useful Improvements in Speed-Reducing Gear, of which the following is a specification.

My invention consists in a detached independent and reversible reducing-gear for use in connection with motors and portable power-drills, &c. The object of the invention is to produce a separate device to be used between any source of power and working tools by which the proper and safe speed can be obtained to drive different sizes of tools with safety to both tool and operator with a small or ordinary sized motor and to be reversible.

To this end my invention consists in the features of construction and combination hereinafter particularly described and claimed.

In the accompanying drawings, forming part of this specification, Figure 1 is a front elevation of my improved device, partly broken away. Fig. 2 is a section on line $x\ x$ of Fig. 1. Fig. 3 is a rear end view, partly broken away; and Fig. 4 is a detail of a tool used in connection with my device for screwing in bolts.

In the drawings, 2 and 3 represent supporting-plates secured together by bolts 4 and held separated by intermediate bushings 5. The upper ends of the plates are shown connected by a clamp 6. Having journal-support 7 in the lower ends of the supporting-plates is a spindle 8, formed with a square end 9, to which the motor is adapted to be coupled. A gear 10 is keyed upon the spindle 8. Having journal-support 11 in the supporting-plates above the spindle 8 is a spindle 12, having a squared end 13. Keyed upon the spindle 12 are gears 14 and 15, the larger gear, 15, intermeshing with the gear 10, as shown. Having journal-support 16 in the supporting-plates above the spindle 12 is a spindle 17, upon which spindle is keyed a gear 18, intermeshing with the gear 14. The spindle 17 is formed with an axial tapered opening 19, oblong in cross-section, into which may be fitted different tools or their socket members.

To adapt the device for heavy drilling, I provide the detachable feed-screw 21, threaded within a sleeve 22 and provided with a handwheel 20. The sleeve 22 has threaded connection by means of a coupling 23 with the adjacent journal 16. The opposite end of the screw is formed with a supporting-spindle 24. When the device is not used as a drill, the coupling 23 may be loosened to detach the feed-screw and its sleeve.

The device is provided with a V-shaped pipe handle 25, the inner ends of the tubes constituting said handle being connected by couplings 26 with the lower ends of the plates 2 and 3 and the outer ends of said tubes being connected by a coupling 27. In Fig. 4 I show a tool 28, adapted to be used with my pipes for screwing in heavy stay-bolts and studbolts.

In operation the motor is coupled with the square head of either the spindle 8 or the spindle 12 and the tapping or other tool fitted within the opening 19 of the spindle 17. If the motor be secured to the spindle 12, a reduction of speed and increase of power occurs. With the motor thus coupled the tool will revolve left-handed, thus necessitating the motor being reversible. A second reduction of speed and increase of power is obtained when the motor is coupled with the terminal spindle 8. When thus coupled, the tool will revolve right-handed. Where the motor coupled to the spindle 8 is non-reversible, the tube can be withdrawn by shifting the motor to the spindle 12. With a reversible motor such shifting would of course be unnecessary. When the device is not used for drilling, the screw 21 and sleeve 22 are removed. When used for drilling, the screw and sleeve are fitted to the device as shown in Fig. 2, so that by turning the screw 21 the device will move toward and from the work.

While I have shown two sets of gearing, it will be evident that the capacity of the device can be indefinitely increased by increasing the number of the reduction-gears.

Having now described my invention, what I claim as new, and desire to secure by Letters Patent, is—

1. A device of the class described, comprising a pair of supporting-plates, a tool-supporting spindle journaled therein, a pair of driving-spindles journaled in said supporting-plates, means carried by each driving-spindle for detachably connecting the same to a source of power, reduction-gearing operatively connecting each of said driving-spindles with said tool-carrying spindle, said reduction-gearing and said driving-spindle being so arranged and geared that one driving-spindle will revolve right-handed while the other revolves left-handed, as and for the purpose set forth.

2. A device of the class described, consisting of a pair of supporting-plates, a tool-carrying spindle journaled therein, a pair of suitably-actuated driving-spindles journaled in said plates, reduction-gears connecting each of said driving-spindles with said tool-carrying spindle, and a V-shaped pipe handle fastened intermediate of, and extending outwardly from, said plates.

3. A device of the class described, comprising a supporting-frame, a tool-carrying spindle journaled in said frame, said spindle being formed with an axial tool-receiving opening, said opening being oblong in cross-section at its outer end, a pair of suitably-actuated driving-spindles journaled in said frame, and reduction-gears connecting each of said driving-spindles with said tool-carrying spindle.

In testimony whereof I affix my signature in presence of two witnesses.

ERICK NELSON.

Witnesses:
H. S. JOHNSON,
EMILY F. OTIS.